US012608754B2

(12) United States Patent (10) Patent No.: US 12,608,754 B2

Ohhashi et al. (45) Date of Patent: Apr. 21, 2026

(54) IMAGE PROCESSING DEVICE, IMAGE PROCESSING METHOD, AND NON-TRANSITORY COMPUTER READABLE MEDIUM

(71) Applicant: Socionext Inc., Kanagawa (JP)

(72) Inventors: Kazuyuki Ohhashi, Yokohama (JP); Masato Suzuki, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 104 days.

(21) Appl. No.: 18/744,142

(22) Filed: Jun. 14, 2024

(65) Prior Publication Data

US 2024/0331082 A1 Oct. 3, 2024

Related U.S. Application Data

(63) Continuation of application No. PCT/JP2022/015730, filed on Mar. 29, 2022.

(51) Int. Cl.
| | |
|---|---|
| *G06T 5/00* | (2024.01) |
| *G06T 3/08* | (2024.01) |
| *G06T 5/80* | (2024.01) |

(52) U.S. Cl.
CPC . *G06T 3/08* (2024.01); *G06T 5/80* (2024.01)

(58) Field of Classification Search
None
See application file for complete search history.

(56) References Cited

U.S. PATENT DOCUMENTS

| | | | | |
|---|---|---|---|---|
| 2014/0152774 | A1* | 6/2014 | Wakabayashi | G06T 3/00 |
| | | | | 348/46 |
| 2020/0073884 | A1* | 3/2020 | Yamada | G06F 16/587 |
| 2020/0166349 | A1* | 5/2020 | Ogata | G01C 21/005 |
| 2020/0177935 | A1* | 6/2020 | Takasaki | H04N 23/90 |
| 2022/0292629 | A1 | 9/2022 | Ohhashi | |
| 2022/0334583 | A1* | 10/2022 | Imada | G05D 1/0238 |

FOREIGN PATENT DOCUMENTS

| | | |
|---|---|---|
| JP | 2002-354467 A | 12/2002 |
| JP | 2013-074423 A | 4/2013 |
| JP | 2015-015527 A | 1/2015 |
| JP | 2019-191741 A | 10/2019 |

(Continued)

OTHER PUBLICATIONS

Ohhashi. "WO 2021/111531 A1 Translation". Jun. 10, 2021. (Year: 2021).*

(Continued)

*Primary Examiner* — Zhihan Zhou
(74) *Attorney, Agent, or Firm* — Rimon P.C.

(57) ABSTRACT

According to one embodiment, an information processing device includes: a first determination module that determines first information concerning deformation of a projection surface on which a peripheral image of a moving body is projected; and a deformation module that deforms the projection surface based on the first information. The first determination module includes an information retaining module that accumulates second information in the past used for determining the first information, and determines the first information based on the second information in the past at an operation start time of the moving body.

7 Claims, 10 Drawing Sheets

1

(56) References Cited

FOREIGN PATENT DOCUMENTS

| | | | |
|---|---|---|---|
| JP | 2020-034528 | A | 3/2020 |
| JP | 2020-083140 | A | 6/2020 |
| JP | 2020-127171 | A | 8/2020 |
| WO | 2019/039507 | A1 | 2/2019 |
| WO | 2021/065241 | A1 | 4/2021 |
| WO | 2021/111531 | A1 | 6/2021 |

OTHER PUBLICATIONS

International Search Report dated Jun. 21, 2022 issued in International Patent Application No. PCT/JP2022/015730, with English translation.
Written Opinion of the International Searching Authority dated Jun. 21, 2022 issued in International Patent Application No. PCT/JP2022/015730, with English translation.
Office Action dated Aug. 5, 2025, in corresponding Japan Patent Application No. 2024-510837, 6 pages (partial English translation).

* cited by examiner

FIG.4

IMAGE PROCESSING DEVICE, IMAGE PROCESSING METHOD, AND NON-TRANSITORY COMPUTER READABLE MEDIUM

CROSS-REFERENCE TO RELATED APPLICATIONS

This application is a continuation of International Application No. PCT/JP2022/015730, filed on Mar. 29, 2022, the entire contents of which are incorporated herein by reference.

FIELD

Embodiments described herein relate generally to an image processing device, an image processing method, and a computer program product.

BACKGROUND

There is a technique of generating a bird's-eye view image around a moving body such as a vehicle by using images of a plurality of cameras mounted on the moving body. Moreover, there is a technique of changing a shape of a projection surface of a bird's-eye view image according to a three-dimensional object around a moving body. Furthermore, there is a technology of acquiring position information around a moving body by using Visual Simultaneous Localization and Mapping (represented as VSLAM) or the like for performing SLAM using an image captured by a camera. For example, conventional technologies are described in patent documents, which are WO 2021/065241 A, JP 2020-083140 A, WO 2019/039507 A, JP 2020-034528 A, JP 2019-191741 A, and JP 2002-354467 A.

However, when the projection surface of the bird's-eye view image is sequentially deformed according to the three-dimensional object around the moving body, for example, when the engine is started a while after parking, the bird's-eye view image may be unnatural.

SUMMARY

An image processing device according to the present disclosure includes: a first determination module configured to determine first information concerning deformation of a projection surface on which a peripheral image of a moving body is projected; and a deformation module configured to deform the projection surface based on the first information. The first determination module includes an information retaining module configured to accumulate second information in past used for determining the first information, and is configured to determine the first information based on the second information in the past at an operation start time of the moving body.

BRIEF DESCRIPTION OF THE DRAWINGS

FIG. 4 is a schematic diagram illustrating an example of environmental map information according to the embodiment;

DETAILED DESCRIPTION

Hereinafter, embodiments of an image processing device, an image processing method, and a computer program product disclosed in the present application will be explained in detail with reference to the accompanying drawings. Note that the following embodiments do not limit the disclosed technology. The embodiments can be combined as appropriate within a range in which processing contents do not contradict one another.

Figure 1:
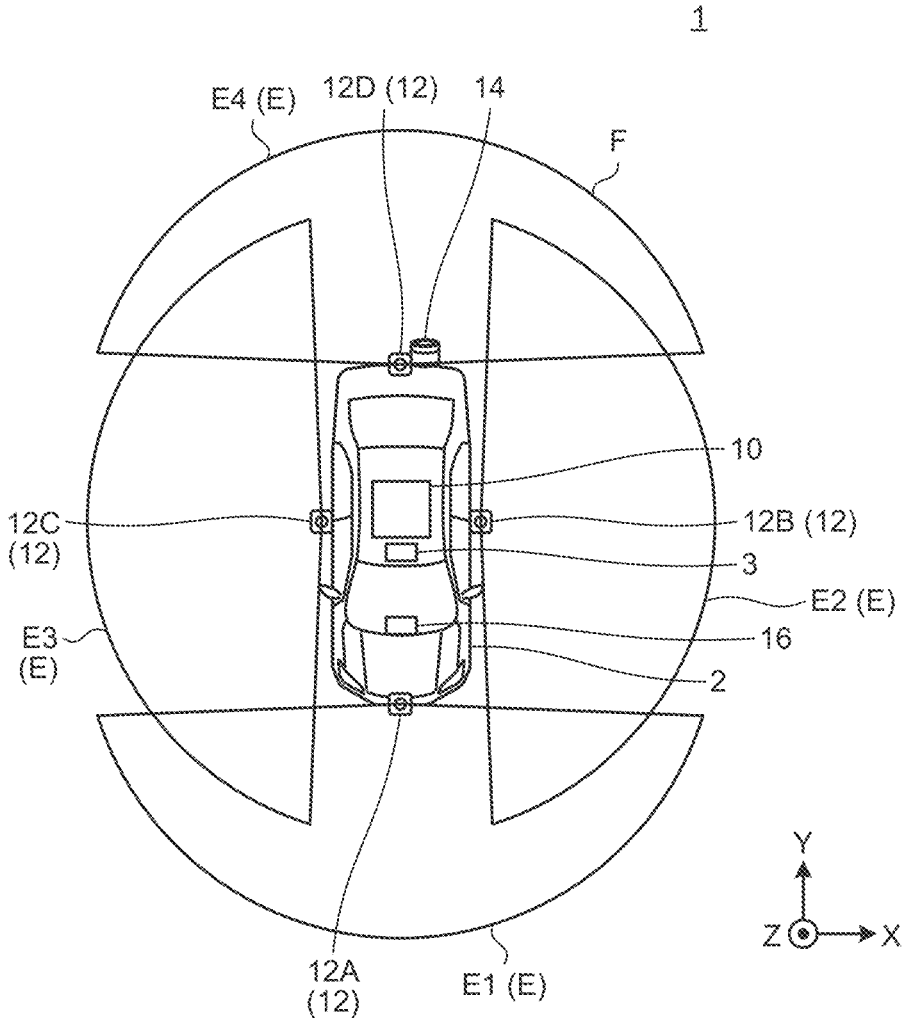
FIG. 1 is a diagram illustrating an example of an overall configuration of an information processing system according to an embodiment.

FIG. 1 is a diagram illustrating an example of an overall configuration of an information processing system 1 in an embodiment. The information processing system 1 includes an information processing device 10, an imaging unit 12, a detection unit 14, and a display unit 16. The information processing device 10, the imaging unit 12, the detection unit 14, and the display unit 16 are connected to be capable of exchanging data or signals. Note that the information processing device 10 is an example of the image processing device. An information processing method executed by the information processing device 10 is an example of the image processing method. An information processing program used by the information processing device 10 to execute the information processing method is an example of the computer program product.

In the present embodiment, a mode in which the information processing device 10, the imaging unit 12, the detection unit 14, and the display unit 16 are mounted on a moving body 2 is explained as an example.

The moving body 2 is a movable object. The moving body 2 is, for example, a vehicle, a flying object (a manned airplane, an unmanned airplane (for example, a UAV (Unmanned Aerial Vehicle) or a drone)), a robot, or the like. The moving body 2 is, for example, a moving body that travels via driving operation by a person or a moving body capable of automatically traveling (autonomously traveling) not via driving operation by a person. In the present embodiment, a case in which the moving body 2 is a vehicle is explained as an example. The vehicle is, for example, a two-wheeled automobile, a three-wheeled automobile, or a four-wheeled automobile. In the present embodiment, a case in which the vehicle is an autonomously travelable four-wheeled vehicle is explained as an example.

Note that all of the information processing device 10, the imaging unit 12, the detection unit 14, and the display unit 16 are not limited to the form of being mounted on the moving body 2. The information processing device 10 may be mounted on, for example, a stationary object. The stationary object is an object fixed to the ground. The stationary object is an immovable object or an object standing still on the ground. The stationary object is, for example, a traffic light, a parked vehicle, or a road sign. The information processing device 10 may be mounted on a cloud server that executes processing on the cloud.

The imaging unit 12 images the periphery of the moving body 2 and acquires captured image data. In the following explanation, the captured image data is simply referred to as captured image. In the present embodiment, explanation is given on the assumption that the imaging unit 12 is, for example, a digital camera capable of capturing a moving image, for example, a monocular fisheye camera having a viewing angle of approximately 195 degrees. Note that imaging indicates converting an image of a subject formed by an optical system such as a lens into an electric signal. The imaging unit 12 outputs the captured image to the information processing device 10.

In the present embodiment, a mode in which four imaging units 12, that is, a front imaging unit 12A, a left imaging unit 12B, a right imaging unit 12C, and a rear imaging unit 12D are mounted on the moving body 2 is explained as an example. The plurality of imaging units 12 (the front imaging unit 12A, the left imaging unit 12B, the right imaging unit 12C, and the rear imaging unit 12D) respectively image subjects in imaging regions E (a front imaging region E1, a left imaging region E2, a right imaging region E3, and a rear imaging region E4) in different directions to acquire captured images. That is, it is assumed that the plurality of imaging units 12 have different imaging directions. It is assumed that the imaging directions of the plurality of imaging units 12 are adjusted in advance such that at least parts of the imaging regions E overlap among the imaging units 12 adjacent to one another. In FIG. 1, the imaging regions E are illustrated in sizes illustrated in FIG. 1 for convenience of explanation. However, actually, the imaging regions E include regions further away from the moving body 2.

The four front imaging unit 12A, left imaging unit 12B, right imaging unit 12C, and rear imaging unit 12D are examples. The number of the imaging units 12 is not limited. For example, when the moving body 2 has a vertically long shape like a bus or a truck, it is also possible to dispose the imaging units 12 one by one in the front, the rear, the front of the right side surface, the rear of the right side surface, the front of the left side surface, and the rear of the left side surface of the moving body 2 and use six imaging units 12 in total. That is, the number and disposition positions of the imaging units 12 can be optionally set according to the size and the shape of the moving body 2.

The detection unit 14 detects position information of each of a plurality of detection points around the moving body 2. In other words, the detection unit 14 detects position information of each of detection points in a detection region F. The detection point indicates each of points individually observed by the detection unit 14 in a real space. The detection point corresponds to, for example, a three-dimensional object around the moving body 2. Note that the detection unit 14 is an example of an external sensor.

The detection unit 14 is, for example, a 3D (Three-Dimensional) scanner, a 2D (Two Dimensional) scanner, a distance sensor (a millimeter wave radar or a laser sensor), a sonar sensor that detects an object with sound waves, or an ultrasonic sensor. The laser sensor is, for example, a three-dimensional LiDAR (Laser imaging Detection and Ranging) sensor. The detection unit 14 may be a device using a technique of measuring a distance from an image captured by a stereo camera or a monocular camera, for example, a SfM (Structure from Motion) technique. The plurality of imaging units 12 may be used as the detection unit 14. One of the plurality of imaging units 12 may be used as the detection unit 14.

The display unit 16 displays various kinds of information. The display unit 16 is, for example, an LCD (Liquid Crystal Display) or an organic EL (Electro-Luminescence) display.

In the present embodiment, the information processing device 10 is communicably connected to an electronic control unit (ECU) 3 mounted on the moving body 2. The ECU 3 is a unit that performs electronic control for the moving body 2. In the present embodiment, it is assumed that the information processing device 10 is capable of receiving CAN (Controller Area Network) data such as speed and a moving direction of the moving body 2 from the ECU 3.

Next, a hardware configuration of the information processing device 10 is explained.

Figure 2:
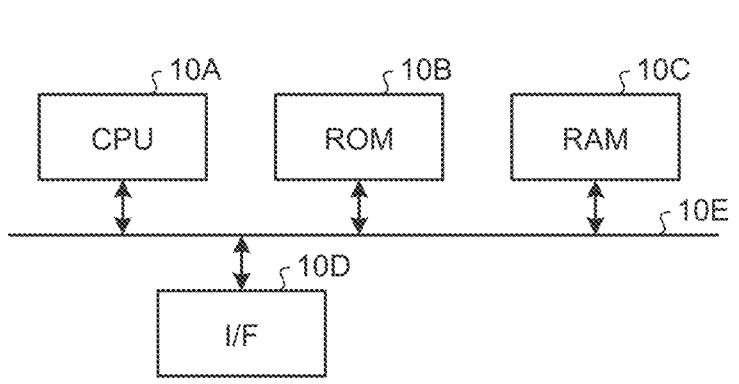
FIG. 2 is a diagram illustrating an example of a hardware configuration of an information processing device according to the embodiment.

FIG. 2 is a diagram illustrating an example of the hardware configuration of the information processing device 10.

The information processing device 10 includes a CPU (Central Processing Unit) 10A, a ROM (Read Only Memory) 10B, a RAM (Random Access Memory) 10C, and an I/F (InterFace) 10D and is, for example, a computer. The CPU 10A, the ROM 10B, the RAM10C, and the I/F 10D are connected to one another by a bus 10E and have a hardware configuration using a normal computer.

The CPU 10A is an arithmetic device that controls the information processing device 10. The CPU 10A corresponds to an example of a hardware processor. The ROM 10B stores programs and the like for implementing various kinds of processing by the CPU 10A. The RAM10C stores data necessary for the various kinds of processing by the CPU 10A. The I/F 10D is an interface for connecting to the imaging unit 12, the detection unit 14, the display unit 16, the ECU 3, and the like and transmitting and receiving data.

A program for executing information processing executed by the information processing device 10 in the present embodiment is provided by being incorporated in the ROM 10B or the like in advance. Note that the program executed by the information processing device 10 in the present embodiment may be configured to be provided by being recorded in a recording medium as a file in a format installable in the information processing device 10 or an executable format. The recording medium is a computer-readable medium. The recording medium is a CD (Compact Disc)-ROM, a flexible disk (FD), a CD-R (Recordable), a DVD (Digital Versatile Disk), a USB (Universal Serial Bus) memory, an SD (Secure Digital) card, or the like.

Next, a functional configuration of the information processing device 10 according to the present embodiment is explained. The information processing device 10 simultaneously estimates, with VSLAM processing, surrounding position information of the moving body 2 and self-position information of the moving body 2 from a captured image captured by the imaging unit 12. The information processing device 10 connects a plurality of spatially adjacent captured images to generate a combined image (a bird's-eye view image) overlooking the periphery of the moving body 2 and displays the combined image. Note that, in the present embodiment, at least one of the imaging units 12 is used as the detection unit 14. The detection unit 14 executes processing of an image acquired from the imaging unit 12.

Figure 3:
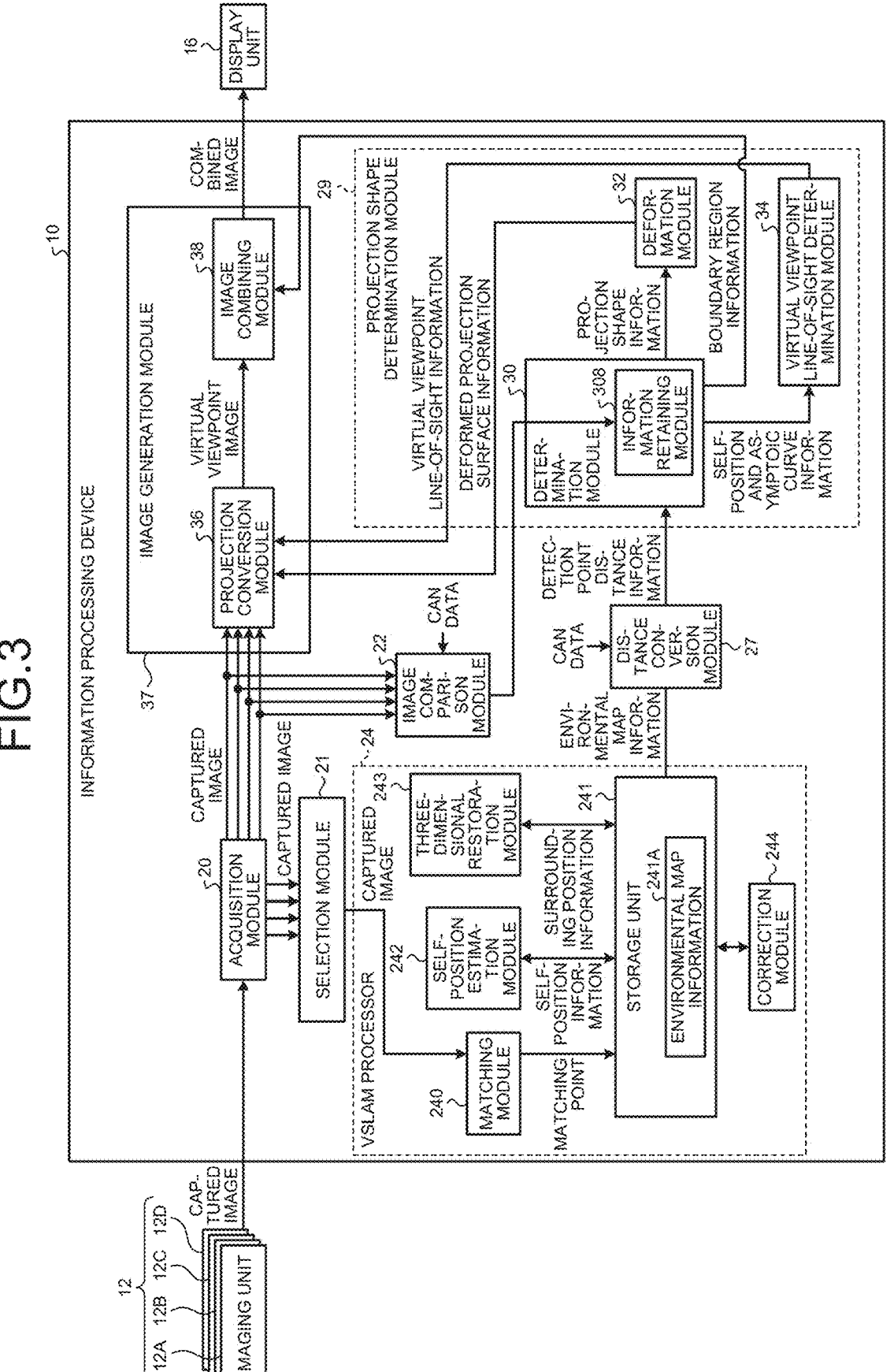
FIG. 3 is a diagram illustrating an example of a functional configuration of the information processing device according to the embodiment.

FIG. 3 is a diagram illustrating an example of a functional configuration of the information processing device 10. Note that, in order to clarify a data input/output relation, FIG. 3 also illustrates the imaging unit 12 and the display unit 16 in addition to the information processing device 10.

The information processing device 10 executes projection surface deformation optimization processing. Here, the projection surface deformation optimization processing is to accumulate information in the past used for projection surface deformation and make the accumulated information in the past available for the projection surface deformation at an operation start time of the moving body 2. The projection surface deformation optimization processing is explained in detail below.

The information processing device 10 includes an acquisition module 20, a selection module 21, an image comparison module 22, a VSLAM processor 24, a distance conversion module 27, a projection shape determination module 29 including an information retaining module 308, and an image generation module 37.

A part or all of the plurality of units may be implemented, for example, by causing a processing device such as the CPU 10A to execute a program, that is, by software. A part or all of the plurality of units may be implemented by hardware such as an IC (Integrated Circuit) or may be implemented by using software and hardware in combination.

The acquisition module 20 acquires a captured image from the imaging unit 12. That is, the acquisition module 20 acquires a captured image from each of the front imaging unit 12A, the left imaging unit 12B, the right imaging unit 12C, and the rear imaging unit 12D.

Every time the acquisition module 20 acquires a captured image, the acquisition module 20 outputs the acquired captured image to a projection conversion module 36 and the selection module 21.

The selection module 21 selects a detection region of a detection point. In the present embodiment, the selection module 21 selects the detection region by selecting at least one imaging unit 12 among the plurality of imaging units 12 (the imaging units 12A to 12D).

The image comparison module 22 sequentially receives input of a front image, a left image, a right image, and a rear image captured by the front imaging unit 12A, the left imaging unit 12B, the right imaging unit 12C, and the rear imaging unit 12D, via the acquisition module 20.

In the projection surface deformation optimization processing, the image comparison module 22 calculates a similarity degree between a first image associated with a first trigger and a second image associated with a second trigger among a plurality of images obtained by imaging the periphery of the moving body 2. More specifically, the image comparison module 22 calculates the similarity degree between the first image associated with the first trigger and the second image associated with the second trigger for each of the forward, leftward, rightward, and rearward directions.

Here, the first trigger is a signal (information) indicating that the moving body 2 is in a parking completion state, such as power OFF (operation end processing) of the moving body 2 and a parking completion state in an automatic parking mode of the moving body 2. The second trigger is a signal (information) generated after the first trigger and indicates a state in which the moving body 2 starts to move again after parking is completed such as power ON (operation start processing) of the moving body 2 and a movement start state of the moving body 2. Note that the first trigger and the second trigger can be acquired from, for example, CAN data.

The image comparison module 22 also outputs an instruction based on the calculated similarity degree to the information retaining module 308 included in the projection shape determination module 29. More specifically, when the calculated similarity degree exceeds a threshold for each direction, the image comparison module 22 determines that the first image and the second image are similar and outputs, to the information retaining module 308, a first instruction for causing the information retaining module 308 to output neighboring point information accumulated by the information retaining module 308. When the calculated similarity degree is smaller than the threshold for each direction, the image comparison module 22 determines that the first image and the second image are not similar and outputs, to the information retaining module 308, a second instruction for causing the information retaining module 308 to discard the neighboring point information accumulated by the information retaining module 308.

The VSLAM processor 24 generates first information including position information of a peripheral three-dimensional object of the moving body 2 and position information of the moving body 2 based on an image of the periphery of the moving body 2. That is, the VSLAM processor 24 receives a captured image from the selection module 21, executes the VSLAM processing using the captured image to generate the environmental map information, and outputs the generated environmental map information to the distance conversion module 27.

More specifically, the VSLAM processor 24 includes a matching module 240, a storage unit 241, a self-position estimation module 242, a three-dimensional restoration module 243, and a correction module 244.

The matching module 240 performs feature value extraction processing and matching processing between images on a plurality of captured images at different imaging timings (a plurality of captured images in different frames). Specifically, the matching module 240 performs the feature value extraction processing from the plurality of captured images. The matching module 240 performs, on the plurality of captured images at different imaging timings, matching processing of specifying corresponding points among the plurality of captured images by using feature values among the plurality of captured images. The matching module 240 outputs a result of the matching processing to the storage unit 241.

The self-position estimation module 242 estimates a relative self-position with respect to a captured image with projective conversion or the like using the plurality of matching points acquired by the matching module 240. Here, the self-position includes information concerning the position (a three-dimensional coordinate) and inclination (rotation) of the imaging unit 12. The self-position estimation module 242 stores the self-position information as point group information in environmental map information 241A.

The three-dimensional restoration module 243 performs perspective projection conversion processing using a movement amount (a translation amount and a rotation amount) of the self-position estimated by the self-position estimation module 242 and determines a three-dimensional coordinate (a relative coordinate with respect to the self-position) of the matching point. The three-dimensional restoration module 243 stores surrounding position information, which is the determined three-dimensional coordinate, in the environmental map information 241A as point group information.

Accordingly, new surrounding position information and new self-position information are sequentially added to the environmental map information 241A according to the movement of the moving body 2 mounted with the imaging unit 12.

The storage unit 241 stores various data. The storage unit 241 is, for example, a semiconductor memory element such as a RAM or a flash memory, a hard disk, or an optical disk. Note that the storage unit 241 may be a storage device provided on the outside of the information processing device 10. The storage unit 241 may be a storage medium. Specifically, the storage medium may store or temporarily store a program or various kinds of information downloaded via a LAN (Local Area Network), the Internet, or the like.

The environmental map information 241A is information in which point group information, which is the surrounding position information calculated by the three-dimensional restoration module 243, and point group information, which is the self-position information calculated by the self-position estimation module 242, are registered in a three-dimensional coordinate space having a predetermined position in the real space as an origin (a reference position). The predetermined position in the real space may be decided based on, for example, a preset condition.

For example, the predetermined position used for the environmental map information 241A is the self-position of the moving body 2 at the time when the information processing device 10 executes the information processing in the present embodiment. For example, a case in which the information processing is executed at predetermined timing such as a parking scene of the moving body 2 is assumed. In this case, the information processing device 10 only has to set, as the predetermined position, the self-position of the moving body 2 at the time when discriminating that the predetermined timing has been reached. For example, when discriminating that the behavior of the moving body 2 has become a behavior indicating a parking scene, the information processing device 10 only has to determine that the predetermined timing has been reached. A behavior indicating a parking scene caused by a backward movement is, for example, a case in which the speed of the moving body 2 becomes equal to or lower than predetermined speed, a case in which a gear of the moving body 2 is shifted into the back gear, a case in which a signal indicating the start of parking is received according an operation instruction of a user. Note that the predetermined timing is not limited to the parking scene.

Figure 4:
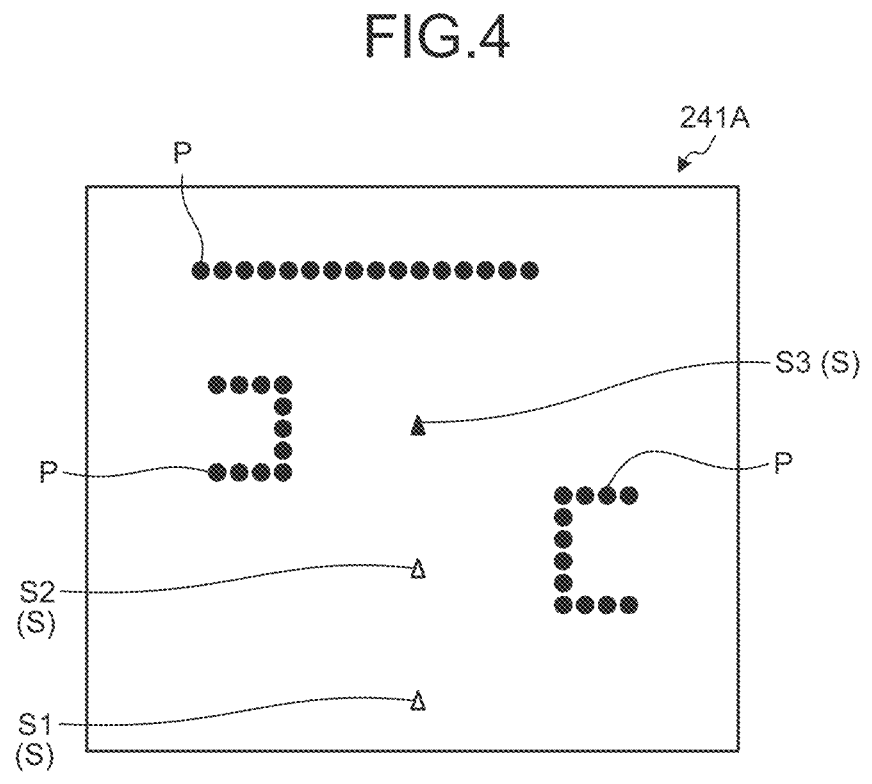

FIG. 4 is a schematic diagram of an example in which information concerning a specific height in the environmental map information 241A is extracted. As illustrated in FIG. 4, the environmental map information 241A is information in which point group information, which is position information (surrounding position information) of each of detection points P, and point group information, which is self-position information of self-positions S of the moving body 2, are registered at corresponding coordinate positions in a three-dimensional coordinate space. Note that, in FIG. 4, the self-position S, that is, a self-position S1 to a self-position S3, are illustrated as an example. A larger value of a numerical value following S means that the self-position S is closer to current timing.

The correction module 244 corrects, for points matched a plurality of times among a plurality of frames, surrounding position information and self-position information registered in the environmental map information 241A using, for example, the least squares method such that the sum of the differences in distance in a three-dimensional space is minimized between a three-dimensional coordinate calculated in the past and a three-dimensional coordinate calculated anew. Note that the correction module 244 may correct a movement amount (a translation amount and a rotation amount) of the self-position used in a process of calculating the self-position information and the surrounding position information.

Timing of correction processing by the correction module 244 is not limited. For example, the correction module 244 only has to execute the correction processing at every predetermined timing. The predetermined timing may be decided based on, for example, a preset condition. Note that, in the present embodiment, a case in which the information processing device 10 includes the correction module 244 is explained as an example. However, the information processing device 10 may not include the correction module 244.

The distance conversion module 27 converts relative positional relation between a self-position and a peripheral three-dimensional object, which can be known from the environmental map information, into the absolute value of the distance from the self-position to the peripheral three-dimensional object, generates detection point distance information of the peripheral three-dimensional object, and outputs the detection point distance information to a determination module 30. Here, the detection point distance information is information obtained by offsetting the self-position to a coordinate (0, 0, 0) and converting a calculated measurement distance (coordinate) to each of the plurality of detection points P into, for example, meter unit. That is, the information concerning the self-position of the moving body 2 is included as the coordinate (0, 0, 0) of the origin in the detection point distance information.

In the distance conversion executed by the distance conversion module 27, for example, vehicle state information such as speed data of the moving body 2 included in CAN data delivered from the ECU 3 is used. For example, in the case of the environmental map information 241A illustrated in FIG. 4, a relative positional relation between the self-positions S and the plurality of detection points P can be known but the absolute value of the distance is not calculated. Here, the distance between the self-position S3 and the self-position S2 can be calculated from an inter-frame period in which self-position calculation is performed and speed data in the inter-frame period according to the vehicle state information. Since a relative positional relation of the environmental map information 241A is a similar relation to that of the real space, the absolute value of the distances from the self-positions S to all the other detection points P can also be calculated because the distance between the self-position S3 and the self-position S2 is known. That is, the distance conversion module 27 converts the relative positional relation between the self-position and the peripheral three-dimensional object into the absolute value of the distance from the self-position to the peripheral three-dimensional object using actual speed data of the moving body 2 included in the CAN data.

Note that the vehicle state information included in the CAN data and the environmental map information output from the VSLAM processor 24 can be associated by time information. When the detection unit 14 acquires distance information of the detection points P, the distance conversion module 27 may be omitted.

The projection shape determination module 29 determines a shape of a projection surface for projecting an image acquired by the imaging unit 12 mounted on the moving body 2 and generating a bird's-eye view image.

Here, the projection surface is a stereoscopic plane for projecting a peripheral image of the moving body 2 as a bird's-eye view image. The peripheral image of the moving body 2 is a captured image of the periphery of the moving body 2 and is a captured image captured by each of the imaging unit 12A to the imaging unit 12D. The projection shape of the projection surface is a three-dimensional (3D) shape virtually formed in a virtual space corresponding to the real space. In the present embodiment, the determination of the projection shape of the projection surface executed by the projection shape determination module 29 is referred to as projection shape determination processing.

Specifically, the projection shape determination module 29 includes a determination module 30 including the information retaining module 308, a deformation module 32, and a virtual viewpoint line-of-sight determination module 34.

Configuration Example of the Determination Module 30

An example of a detailed configuration of the determination module 30 illustrated in FIG. 3 is explained below.

Figure 5:
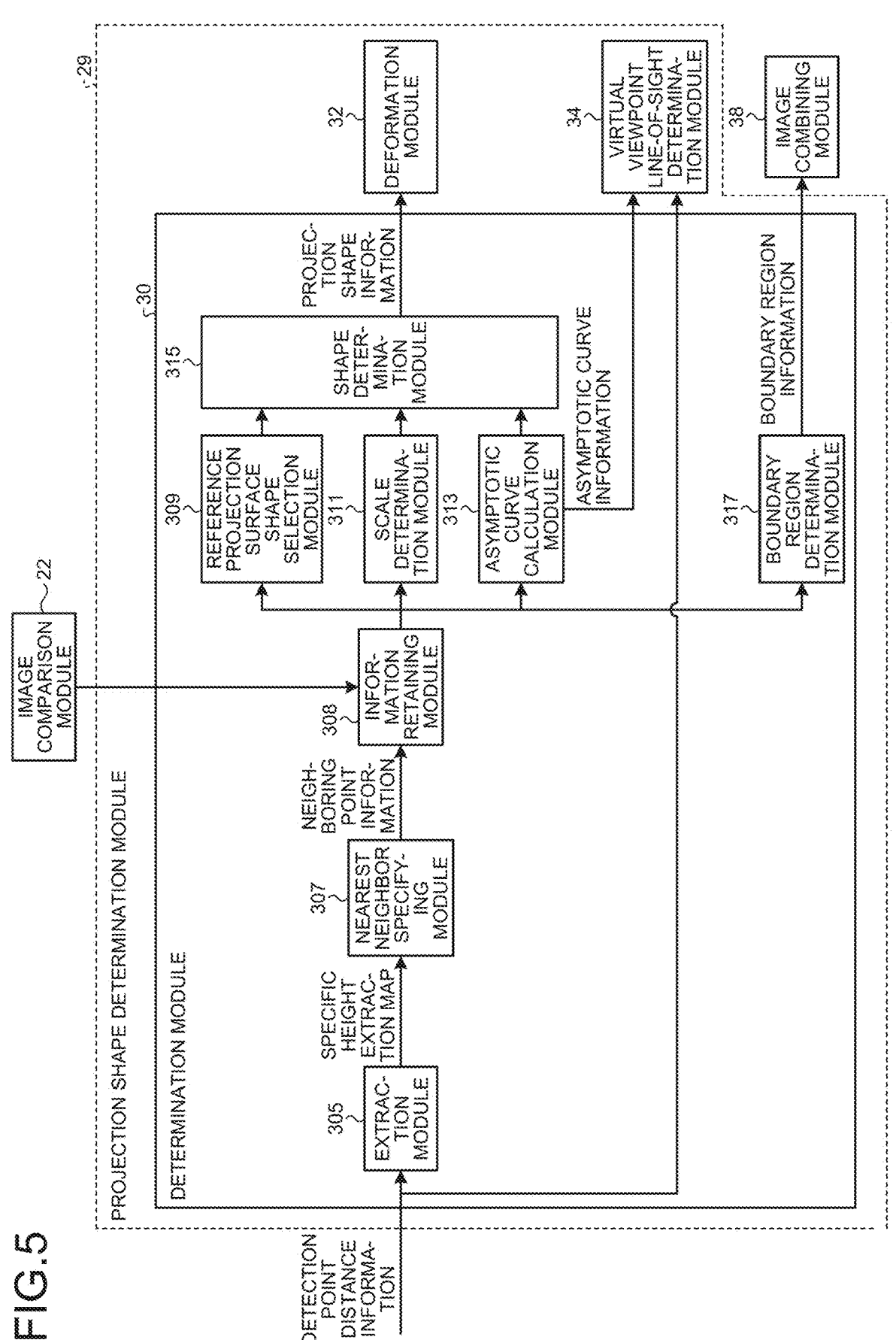
FIG. 5 is a schematic diagram illustrating an example of a functional configuration of a determination module.

FIG. 5 is a schematic diagram illustrating an example of a functional configuration of the determination module 30. As illustrated in FIG. 5, the determination module 30 includes an extraction module 305, a nearest neighbor specifying module 307, an information retaining module 308, a reference projection surface shape selection module 309, a scale determination module 311, an asymptotic curve calculation module 313, a shape determination module 315, and a boundary region determination module 317.

The extraction module 305 extracts the detection point P present within a specific range among the plurality of detection points P, measurement distances of which are received from the distance conversion module 27, and generates a specific height extraction map. The specific range is, for example, a range from a road surface on which the moving body 2 is disposed to a height corresponding to the vehicle height of the moving body 2. Note that the range is not limited to this range.

The extraction module 305 extracts the detection point P within the range and generates the specific height extraction map, whereby, for example, it is possible to extract the detection point P of an object that hinders the traveling of the moving body 2 an object located adjacent to the moving body 2, or the like.

The extraction module 305 outputs the generated specific height extraction map to the nearest neighbor specifying module 307.

The nearest neighbor specifying module 307 divides the periphery of the self-position S of the moving body 2 for each specific range (for example, angular range) using the specific height extraction map, specifies the detection point P closest to the moving body 2 or a plurality of detection points P in order of closeness to the moving body 2 for each range, and generates neighboring point information. In the present embodiment, a mode in which the nearest neighbor specifying module 307 specifies the plurality of detection points P in order of closeness to the moving body 2 for each range and generates neighboring point information is explained as an example.

The nearest neighbor specifying module 307 outputs a measurement distance of the detection point P specified for each range as the neighboring point information to the information retaining module 308.

The information retaining module 308 accumulates neighboring point information (second information) in the past used to determine projection surface shape information (first information) in projection surface deformation optimization processing and outputs the accumulated neighboring point information in the past to the reference projection surface shape selection module 309, the scale determination module 311, the asymptotic curve calculation module 313, and the boundary region determination module 317 in a later stage at an operation start time of the moving body 2.

Specifically, in response to the first trigger included in the CAN data from the ECU, the information retaining module 308 retains neighboring point information corresponding to an operation end time of the moving body 2. In response to the first instruction from the image comparison module 22, the information retaining module 308 outputs the retained neighboring point information to the reference projection surface shape selection module 309, the scale determination module 311, the asymptotic curve calculation module 313, and the boundary region determination module 317. In response to the second instruction from the image comparison module 22, the information retaining module 308 discards the retained neighboring point information.

Note that, in the present embodiment, to make explanation specific, it is assumed that the neighboring point information is acquired as the positions of neighboring points, for example, every 90 degrees in four directions of the front, left, right, and rear of the moving body 2. The information retaining module 308 receives the first instruction and the second instruction from the image comparison module 22 for each direction. Therefore, the information retaining module 308 outputs or discards the neighboring point information retained for each direction.

In response to the second instruction from the image comparison module 22, the information retaining module 308 outputs new neighboring point information based on environmental map information generated anew by the VSLAM processing to the reference projection surface shape selection module 309, the scale determination module 311, the asymptotic curve calculation module 313, and the boundary region determination module 317 in in the later stage.

Note that the information retaining module 308 may accumulate, as the second information, point group information that is position information (surrounding position information) of each of the detection points P besides the neighboring point information in the past used to determine the projection surface shape information.

The reference projection surface shape selection module 309 selects a shape of the reference projection surface.

Figure 6:
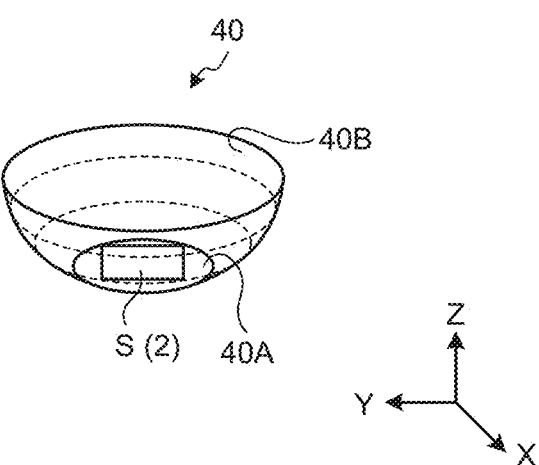
FIG. 6 is a schematic view illustrating an example of a reference projection surface.

FIG. 6 is a schematic diagram illustrating an example of a reference projection surface 40. The reference projection surface is explained with reference to FIG. 6. The reference projection surface 40 is, for example, a projection surface having a shape serving as a reference when the shape of the projection surface is changed. The shape of the reference projection surface 40 is, for example, a bowl shape, a cylindrical shape, or the like. Note that FIG. 6 illustrates the bowl-shaped reference projection surface 40.

The bowl shape is a shape including a bottom surface 40A and a side wall surface 40B, one end of the side wall surface 40B continuing to the bottom surface 40A and the other end being opened. The width of the horizontal cross section of the side wall surface 40B increases from the bottom surface 40A side toward the opening side of the other end portion.

The bottom surface 40A has, for example, a circular shape. Here, the circular shape is a shape including a perfect circular shape and a circular shape other than the perfect circular shape such as an elliptical shape. The horizontal cross section is an orthogonal plane orthogonal to the vertical direction (an arrow Z direction). The orthogonal plane is a two-dimensional plane extending along an arrow X direction orthogonal to the arrow Z direction and an arrow Y direction orthogonal to the arrow Z direction and the arrow X direction. In the following explanation, the horizontal cross section and the orthogonal plane is sometimes referred to as an XY plane. Note that the bottom surface 40A may have a shape other than the circular shape such as an egg shape.

The cylindrical shape is a shape including a circular bottom surface 40A and a side wall surface 40B continuous to the bottom surface 40A. The side wall surface 40B configuring the cylindrical reference projection surface 40 has a cylindrical shape, an opening at one end portion of which is continuous to the bottom surface 40A and the other end portion of which is opened. However, the side wall surface 40B configuring the cylindrical reference projection surface 40 has a shape, the diameter of an XY plane of which is substantially constant from the bottom surface 40A side toward the opening side of the other end portion. Note that the bottom surface 40A may have a shape other than the circular shape such as an egg shape.

In the present embodiment, a case where the shape of the reference projection surface 40 is the bowl shape illustrated in FIG. 6 is explained as an example. The reference projection surface 40 is a stereoscopic model virtually formed in a virtual space in which the bottom surface 40A is a surface substantially coinciding with a road surface below the moving body 2 and the center of the bottom surface 40A is a self-position S of the moving body 2.

The reference projection surface shape selection module 309 reads one specific shape from a plurality of kinds of reference projection surfaces 40 to select a shape of the reference projection surface 40. For example, the reference projection surface shape selection module 309 selects the shape of the reference projection surface 40 according to a positional relation, a distance, and the like between the self-position and the peripheral three-dimensional object. Note that the reference projection surface shape selection module 309 may select the shape of the reference projection surface 40 according to an operation instruction of the user. The reference projection surface shape selection module 309 outputs determined shape information of the reference projection surface 40 to the shape determination module 315. In the present exemplary embodiment, as explained above, a mode in which the reference projection surface shape selection module 309 selects the bowl-shaped reference projection surface 40 is explained as an example.

The scale determination module 311 determines a scale of reference projection surface 40 having the shape selected by the reference projection surface shape selection module 309. For example, the scale determination module 311 determines to, for example, reduce the scale when the distance from the self-position S to a neighboring point is shorter than a predetermined distance. The scale determination module 311 outputs scale information of the determined scale to the shape determination module 315.

The asymptotic curve calculation module 313 calculates an asymptotic curve of the surrounding position information with respect to the self-position based on the surrounding position information of the moving body 2 and the self-position information included in the environmental map information. The asymptotic curve calculation module 313 outputs asymptotic curve information of a calculated asymptotic curve Q to the shape determination module 315 and the virtual viewpoint line-of-sight determination module 34 using each distance of the detection point P closest from the self-position S for each range from the self-position S received from the information retaining module 308.

Figure 7:
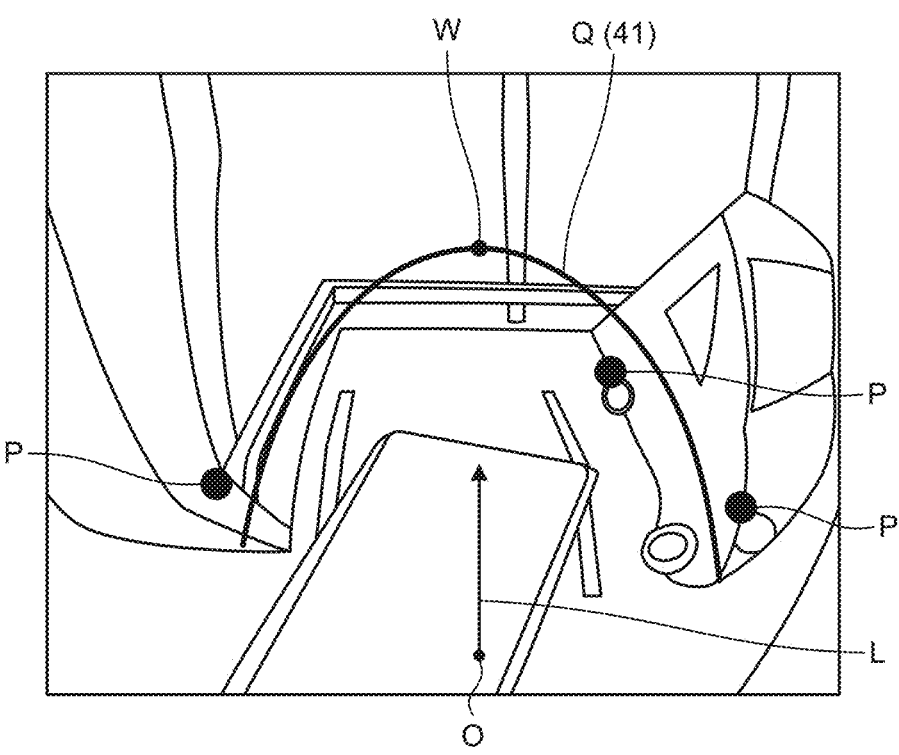
FIG. 7 is an explanatory diagram of an asymptotic curve Q generated by the determination module.

FIG. 7 is an explanatory diagram of the asymptotic curve Q generated by the determination module 30. Here, the asymptotic curve is an asymptotic curve of a plurality of detection points P in the environmental map information. FIG. 7 is an example in which the asymptotic curve Q is illustrated in a projection image obtained by projecting a captured image on a projection surface when the moving body 2 is overviewed from above. For example, it is assumed that the determination module 30 specifies three detection points P in order of closeness to the self-position S of the moving body 2. In this case, the determination module 30 generates the asymptotic curves Q of these three detection points P.

Note that the asymptotic curve calculation module 313 may calculate a representative point located at the center of gravity or the like of the plurality of detection points P for each specific range (for example, angular range) of the reference projection surface 40 and calculate the asymptotic curve Q for the representative point for each of the plurality of ranges. Then, the asymptotic curve calculation module 313 outputs asymptotic curve information of the calculated asymptotic curve Q to the shape determination module 315. Note that the asymptotic curve calculation module 313 may output the asymptotic curve information of the calculated asymptotic curve Q to the virtual viewpoint line-of-sight determination module 34.

The shape determination module 315 enlarges or reduces the reference projection surface 40 having the shape indicated by the shape information received from the reference projection surface shape selection module 309 to the scale of the scale information received from the scale determination module 311. The shape determination module 315 determines, as a projection shape, a shape deformed to be a shape along the asymptotic curve information of the asymptotic curve Q received from the asymptotic curve calculation module 313 with respect to the enlarged or reduced reference projection surface 40.

Figure 8:
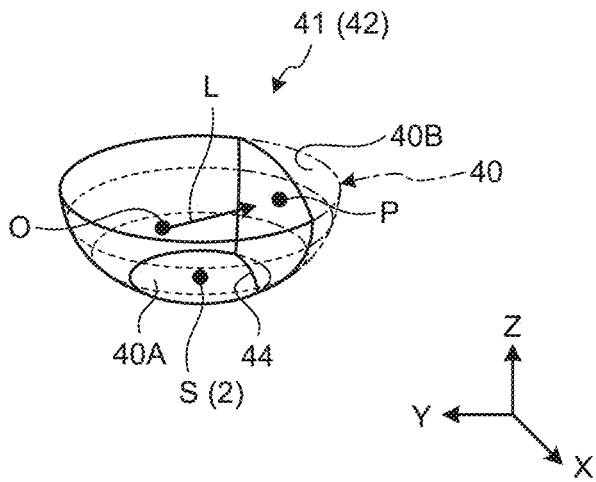
FIG. 8 is a schematic diagram illustrating an example of a projection shape determined by the determination module.

Here, the determination of the projection shape is explained in detail. FIG. 8 is a schematic diagram illustrating an example of a projection shape 41 determined by the determination module 30. As illustrated in FIG. 8, the shape determination module 315 determines, as the projection shape 41, a shape obtained by deforming the reference projection surface 40 into a shape passing through the detection point P closest to the self-position S of the moving body 2, which is the center of the bottom surface 40A of the reference projection surface 40. The shape passing through the detection point P means that the side wall surface 40B after deformation has a shape passing through the detection point P. The self-position S is the self-position S calculated by the self-position estimation module 242.

That is, the shape determination module 315 specifies the detection point P closest to the self-position S among the plurality of detection points P registered in the environmental map information. Specifically, the shape determination module 315 determines an XY coordinate of the center position (the self-position S) of the moving body 2 as (X, Y)=(0, 0). The shape determination module 315 specifies the detection point P at which a value of $X^2+Y^2$ indicates a minimum value as the detection point P closest to the self-position S. The shape determination module 315 determines, as the projection shape 41, a shape obtained by deforming the side wall surface 40B of the reference projection surface 40 to have a shape passing through the detection point P.

More specifically, the shape determination module 315 determines a deformed shape of partial regions of the bottom surface 40A and the side wall surface 40B as the projection shape 41 such that the partial region of the side wall surface 40B becomes a wall surface passing through the detection point P closest to the moving body 2 when the reference projection surface 40 is deformed. The deformed projection shape 41 is, for example, a shape raised from a rising line 44 on the bottom surface 40A toward a direction approaching the center of the bottom surface 40A at the viewpoint of the XY plane (in plan view). Raising means, for example, bending or folding parts of the side wall surface 40B and the bottom surface 40A toward a direction approaching the center of the bottom surface 40A such that an angle formed by the side wall surface 40B and the bottom surface 40A of the reference projection surface 40 becomes a smaller angle. Note that, in the raised shape, the rising line 44 may be located between the bottom surface 40A and the side wall surface 40B and the bottom surface 40A may remain not deformed.

The shape determination module 315 determines a specific region on the reference projection surface 40 to be deformed to protrude to a position passing through the detection point P at a viewpoint (in a plan view) of the XY plane. The shape and the range of the specific region may be determined based on a predetermined standard. The shape determination module 315 determines the shape of the deformed reference projection surface 40 such that the distance from the self-position S continuously increases from the protruded specific region toward a region other than the specific region on the side wall surface 40B. Note that the shape determination module 315 is an example of the projection shape determination module.

For example, as illustrated in FIG. 8, it is preferable to determine the projection shape 41 such that the shape of the outer periphery of the cross section along the XY plane is a curved shape. Note that the shape of the outer periphery of the cross section of the projection shape 41 is, for example, a circular shape but may be a shape other than the circular shape.

Note that the shape determination module 315 may determine, as the projection shape 41, a shape obtained by deforming the reference projection surface 40 to have a shape extending along the asymptotic curve. The shape determination module 315 generates an asymptotic curve of a predetermined number of the plurality of detection points P in a direction away from the detection point P closest to the self-position S of the moving body 2. The number of detection points P only has to be plural. For example, the number of detection points P is preferably three or more. In this case, the shape determination module 315 preferably generates an asymptotic curve of a plurality of detection points P present at positions separated by a predetermined angle or more as viewed from the self-position S. For example, the shape determination module 315 can determine, as the projection shape 41, a shape obtained by deforming the reference projection surface 40 to have a shape extending along the generated asymptotic curve Q in the asymptotic curve Q illustrated in FIG. 7.

Note that the shape determination module 315 may divide the periphery of the self-position S of the moving body 2 for each specific range and specify the detection point P closest to the moving body 2 or a plurality of detection points P in order of closeness to the moving body 2 for each range. The shape determination module 315 may determine, as the projection shape 41, a shape obtained by deforming the reference projection surface 40 have a shape passing through the detection points P specified for each range or a shape extending along the asymptotic curve Q of the plurality of specified detection points P.

The shape determination module 315 outputs the determined projection shape information of the projection shape 41 to the deformation module 32.

Referring back to FIG. 3, the deformation module 32 deforms the projection surface based on the projection shape information received from the determination module 30. This deformation of the reference projection surface is executed based on, for example, the detection point P closest to the moving body 2. The deformation module 32 outputs deformed projection surface information to the projection conversion module 36.

For example, the deformation module 32 deforms, based on the projection shape information, the reference projection surface into a shape extending along an asymptotic curve of a number of the plurality of detection points P predetermined in the order of closeness to the self-position S of the moving body 2.

The virtual viewpoint line-of-sight determination module 34 determines virtual viewpoint line-of-sight information based on the self-position and the asymptotic curve information and outputs the virtual viewpoint line-of-sight information to the projection conversion module 36.

The determination of the virtual viewpoint line-of-sight information is explained with reference to FIG. 7 and FIG. 8. The virtual viewpoint line-of-sight determination module 34 determines, as a line-of-sight direction, for example, a direction that passes through the detection point P closest to the self-position S of the moving body 2 and is perpendicular to the deformed projection surface. For example, the virtual viewpoint line-of-sight determination module 34 fixes a direction of the line-of-sight direction L and determines coordinates of a virtual viewpoint O as any Z coordinate and any XY coordinate in a direction away from the asymptotic curve Q toward the self-position S. In that case, the XY coordinate may be a coordinate at a position farther away from the asymptotic curve Q than the self-position S. Then, the virtual viewpoint line-of-sight determination module 34 outputs virtual viewpoint line-of-sight information indicating the virtual viewpoint O and the line-of-sight direction L to the projection conversion module 36. Note that, as illustrated in FIG. 8, the line-of-sight direction L may be a direction from the virtual viewpoint O toward the position of a vertex W of the asymptotic curve Q.

The image generation module 37 generates a bird's-eye view image around the moving body 2 using the projection surface. Specifically, the image generation module 37 includes a projection conversion module 36 and an image combining module 38.

The projection conversion module 36 generates a projection image obtained by projecting a captured image acquired from the imaging unit 12 on the deformed projection surface based on the deformed projection surface information and the virtual viewpoint line-of-sight information. The projection conversion module 36 converts the generated projection image into a virtual viewpoint image and outputs the virtual viewpoint image to the image combining module 38. Here, the virtual viewpoint image is an image in which the projection image is visually recognized in any direction from a virtual viewpoint.

The projection image generation processing by the projection conversion module 36 is explained in detail with reference to FIG. 8. The projection conversion module 36 projects a captured image onto a deformed projection surface 42. The projection conversion module 36 generates a virtual viewpoint image that is an image obtained by visually recognizing the captured image projected on the deformed projection surface 42 in the line-of-sight direction L from any virtual viewpoint O (not illustrated). The position of the virtual viewpoint O only has to be, for example, the self-position S of the moving body 2 (set as a reference for the projection surface deformation processing). In this case, a value of the XY coordinate of the virtual viewpoint O only has to be set as a value of the XY coordinate of the self-position S of the moving body 2. A value of a Z coordinate (a position in the vertical direction) of the virtual viewpoint O only has to be set as value of a Z coordinate of the detection point P closest to the self-position S of the moving body 2. The line-of-sight direction L may be determined based on, for example, a predetermined reference.

The line-of-sight direction L only has to be, for example, a direction from the virtual viewpoint O toward the detection point P closest to the self-position S of the moving body 2. The line-of-sight direction L may be a direction that passes through the detection point P and is perpendicular to the deformed projection surface 42. The virtual viewpoint line-of-sight information indicating the virtual viewpoint O and the line-of-sight direction L is created by the virtual viewpoint line-of-sight determination module 34.

The image combining module 38 generates a combined image obtained by extracting a part or all of the virtual viewpoint image. For example, the image combining module 38 performs processing of combining a plurality of virtual viewpoint images (here, four virtual viewpoint images corresponding to the imaging units 12A to 12D) in boundary regions among the imaging units.

The image combining module 38 outputs the generated combined image to the display unit 16. Note that the combined image may be a bird's-eye view image in which the upper side of the moving body 2 is the virtual viewpoint O or may be a bird's-eye view image in which the inside of the moving body 2 is the virtual viewpoint O and the moving body 2 is displayed translucently.

Projection Surface Deformation Optimization Processing

Next, the projection surface deformation optimization processing executed by the information processing device 10 according to the present embodiment is explained in detail.

Figure 10:
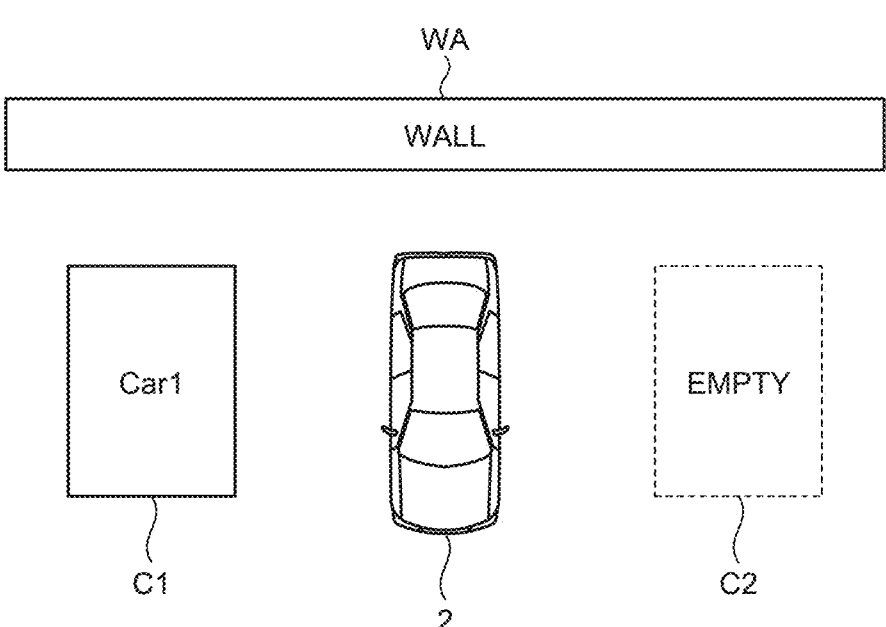
FIG. 10 is a diagram illustrating an example of a situation around the moving body when a predetermined time has elapsed after the backward parking of the moving body.

FIG. 10 is a diagram illustrating an example of a peripheral situation at an operation start time (a departure time) of the moving body 2. In the example illustrated in FIG. 10, a car 1 is present in a parking region C1 on the right side when viewed from a driver of the moving body 2, a wall WA is present behind the moving body 2, and a parking region C2 is in an empty state. Since the car 1 and the wall WA are present in the vicinity of the moving body 2, it is necessary to perform projection surface deformation processing based on surrounding position information in order to obtain a natural bird's-eye view image.

However, in the present embodiment, the VSLAM processing using an image (a monocular image) acquired from one of the imaging units 12 mounted one by one in the directions of the moving body 2 is used to calculate the surrounding position information. Therefore, immediately after the operation start of the moving body 2, the surrounding position information cannot be calculated until the moving body 2 moves. This is because the VSLAM processing by the monocular image uses the principle of motion stereo in which triangulation is performed between images having slightly different acquisition positions sequentially obtained in the time direction by the movement of the moving body 2.

Here, in the information processing device 10 according to the present embodiment, the neighboring point information at a parking completion time is retained in, for example, the information retaining module 308 included in the determination module 30. At the operation start time (the departure time) of the moving body 2 and in a period until new surrounding position information is obtained by the movement of the moving body 2, the information processing device 10 can perform the projection surface deformation processing by using the neighboring point information at the parking completion time retained in the information retaining module 308.

Figure 9:
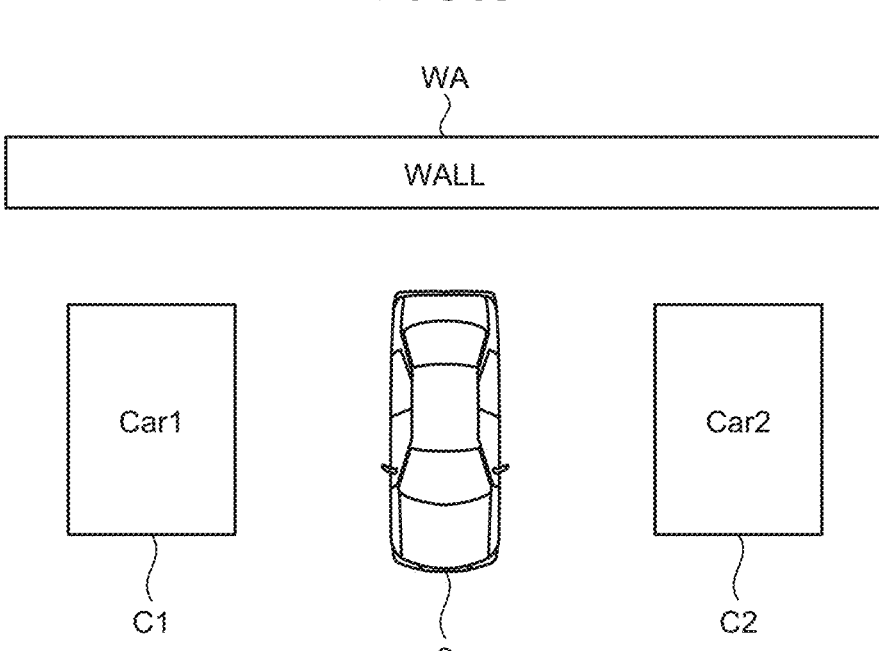
FIG. 9 is a diagram illustrating an example of a situation around a moving body at the time when backward parking of the moving body is completed.

Since time elapses from the parking completion, a peripheral situation at the operation start time (the departure time) sometimes has changed from a peripheral situation at the parking completion time. FIG. 9 is a diagram illustrating an example of a peripheral situation of the moving body 2 at a backward parking completion time of the moving body 2 before a predetermined time elapses from FIG. 10. In FIG. 9, a car 2 is present in a parking region C2.

Here, in the information processing device 10 according to the present embodiment, the image comparison module 22 compares images of the front side, the left side, the right side, and the rear side at the parking completion time with images of the front side, the left side, the right side, and the rear side at the operation start time and calculates a similarity degree. As a result, it is determined that a peripheral situation in a direction in which the similarity degree falls below a threshold has changed from the parking completion time, neighboring point information at the parking completion time is discarded, an asymptotic curve is recalculated using neighboring point information in the remaining directions, and a projection surface shape is redetermined.

Accordingly, in the present embodiment, at the operation start time of the moving body 2, the projection surface shape can be determined according to presence or absence of a change in the peripheral situation. Therefore, at the operation start time of the moving body 2, it is possible to provide a bird's-eye view image more natural compared with the related art.

Figure 11:
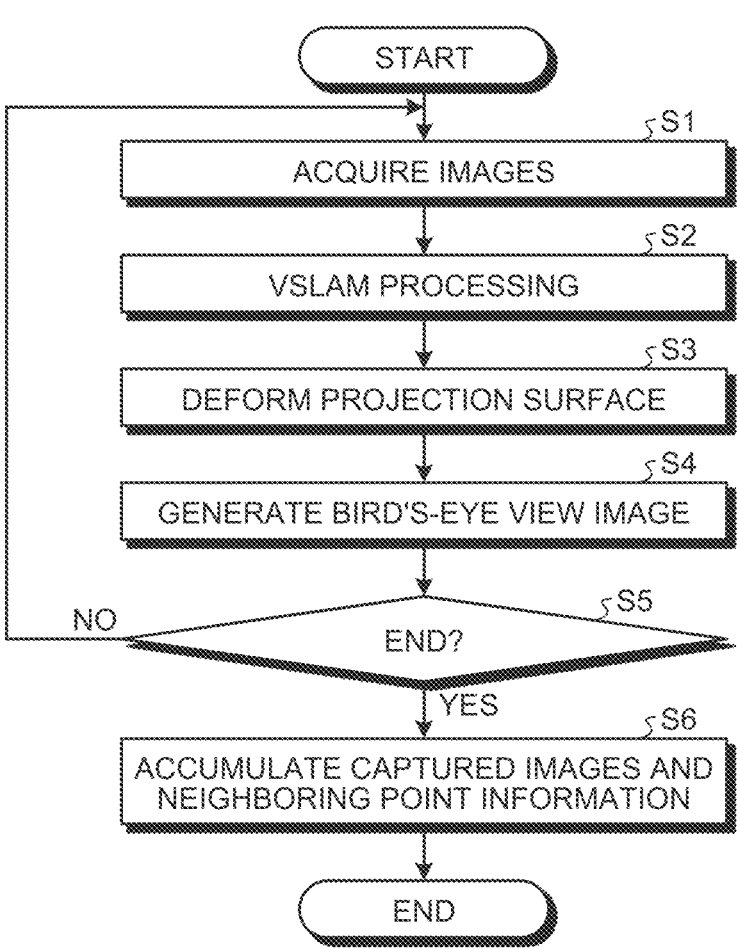
FIG. 11 is a diagram for explaining information accumulation processing executed in projection surface deformation optimization processing according to the embodiment.

FIG. 11 is a flowchart illustrating a flow of information accumulation processing executed in the projection surface deformation optimization processing according to the embodiment. Note that the information accumulation processing is executed, for example, at the parking completion time of the moving body 2 or at timing of power OFF (operation end processing).

First, captured images are acquired by the imaging unit 12 (Step S1).

The VSLAM processor 24 or the like calculates detection point distance information with the VSLAM processing using the captured images (Step S2).

The projection shape determination module 29 deforms a projection surface using the acquired detection point distance information (Step S3).

The image generation module 37 generates a bird's-eye view image using the deformed projection surface (Step S4). The generated bird's-eye view image is displayed on the display unit 16.

The information processing device 10 determines, based on whether a first trigger is included in CAN data from the ECU, whether to end the bird's-eye view image generation processing (Step S5).

When the information processing device 10 determines not to end the bird's-eye view image generation processing (No in Step S5), the processing in Steps S1 to S5 is repeatedly executed.

On the other hand, when the information processing device 10 determines to end the bird's-eye view image generation processing (Yes in Step S5), the image comparison module 22 accumulates the captured images (first images) associated with the first trigger for each direction. The projection shape determination module 29 accumulates neighboring point information associated with the first trigger for each direction (Step S6).

Figure 12:
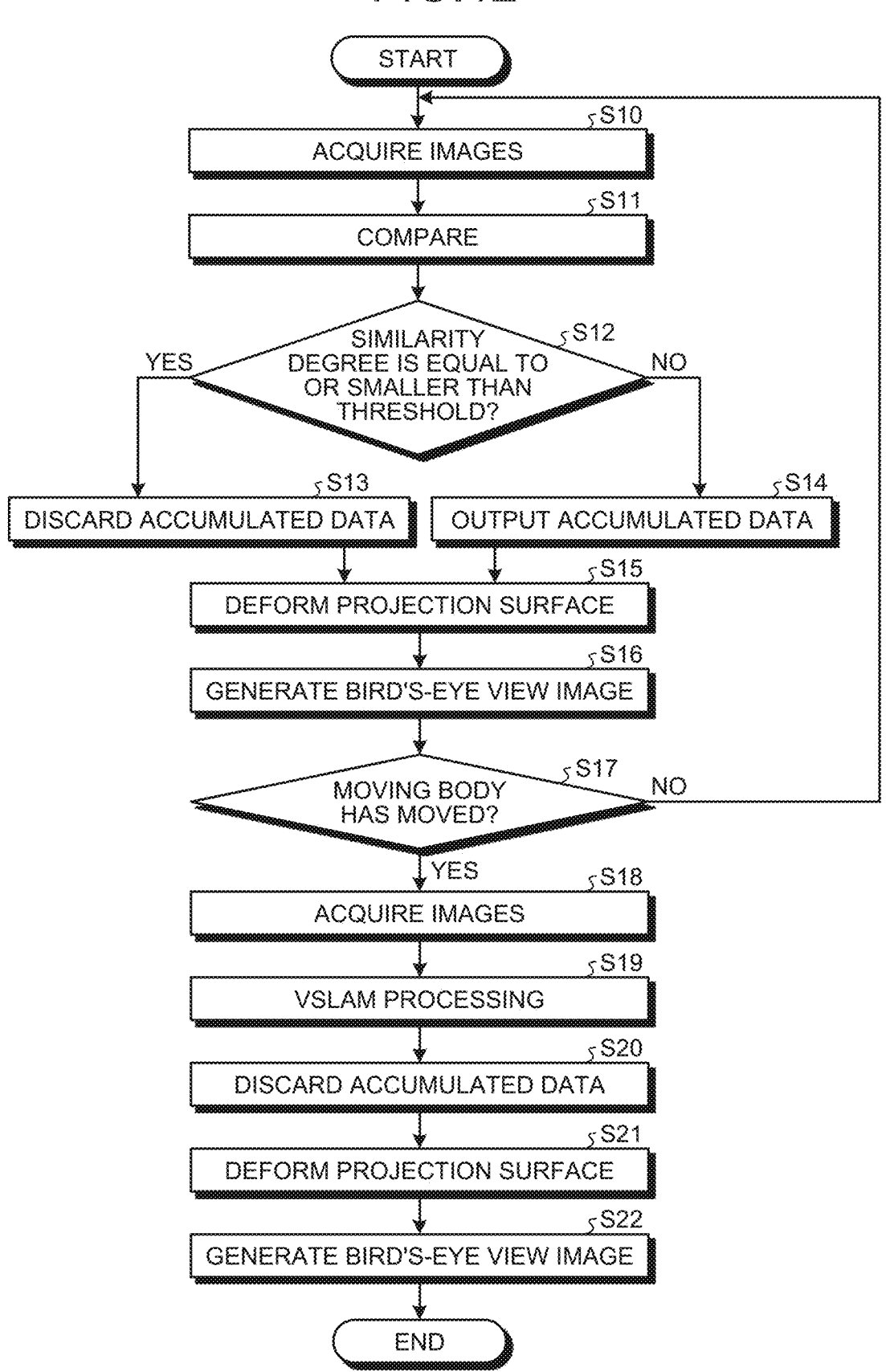
FIG. 12 is a flowchart illustrating a flow of information selection processing executed in the projection surface deformation optimization processing according to the embodiment.

FIG. 12 is a flowchart illustrating a flow of information selection processing executed in the projection surface deformation optimization processing according to the embodiment. Such information selection processing is executed, for example, at timing of the operation start time of the moving body 2. Note that steps of the following Steps S10 to S14 are executed in the forward, leftward, rightward, and rearward directions of the moving body 2.

First, the imaging unit 12 acquires captured images (second images) for respective directions in response to a second trigger included in CAN data from the ECU (Step S10).

The image comparison module 22 compares the captured images associated with the second trigger and the captured images accumulated and associated with the first trigger (Step S11). That is, the image comparison module 22 calculates similarity degrees between the captured images associated with the second trigger and the captured images accumulated and associated with the first trigger.

The image comparison module 22 determines whether the similarity degree is equal to or smaller than a predetermined threshold (Step S12).

When determining that the similarity degree is equal to or smaller than the predetermined threshold (Yes in Step S12), the image comparison module 22 outputs a second instruction to discard the accumulated neighboring point information to the information retaining module 308. The information retaining module 308 discards accumulated data, which is the accumulated neighboring point information, based on the second instruction received from the image comparison module 22 (Step S13). Thereafter, the projection surface deformation and the bird's-eye view image generation are executed using neighboring point information acquired anew.

On the other hand, when the image comparison module 22 determines that the similarity degree is not equal to or smaller than the predetermined threshold (No in Step S12), the image comparison module 22 outputs a first instruction to output the accumulated data, which is the accumulated neighboring point information, to the information retaining module 308. The information retaining module 308 outputs the accumulated neighboring point information based on the first instruction received from the image comparison module 22 (Step S14).

The projection shape determination module 29 deforms the projection surface using the neighboring point information in the directions acquired from the information retaining module 308 (Step S15). Note that, since the number of neighboring points in the direction in which the accumulated data has been discarded is zero, the projection shape determination module 29 performs determination of a scale, calculation of an asymptotic curve, and the like and determines a projection surface shape based on neighboring point information in the remaining directions.

The image generation module 37 generates a bird's-eye view image using the deformed projection surface (Step S16). The drawn bird's-eye view image is displayed on the display unit 16.

The information processing device 10 determines, based on the CAN data from the ECU, whether the moving body 2 has moved (Step S17).

When it is determined that the moving body 2 has moved (Yes in Step S17), the acquisition module 20 acquires captured images for respective directions (Step S18).

The VSLAM processor 24 or the like calculates new detection point distance information with the VSLAM processing using the captured images (Step S19).

Since the new detection point distance information is received, the information retaining module 308 discards the accumulated data, which is the accumulated neighboring point information (Step S20).

The projection shape determination module 29 deforms the projection surface using the new neighboring point information (Step S21).

The image generation module 37 generates a bird's-eye view image using the deformed projection surface (Step S22). The generated bird's-eye view image is displayed on the display unit 16.

On the other hand, when it is determined that the moving body 2 has not moved (No in Step S17), the processing in Steps S10 to S17 is repeatedly executed. At this time, when it is determined that the similarity degree is equal to or smaller than the predetermined threshold because of movement of an adjacent vehicle or the like, the accumulated neighboring point information may be discarded according to an instruction from the image comparison module 22.

Figure 13:
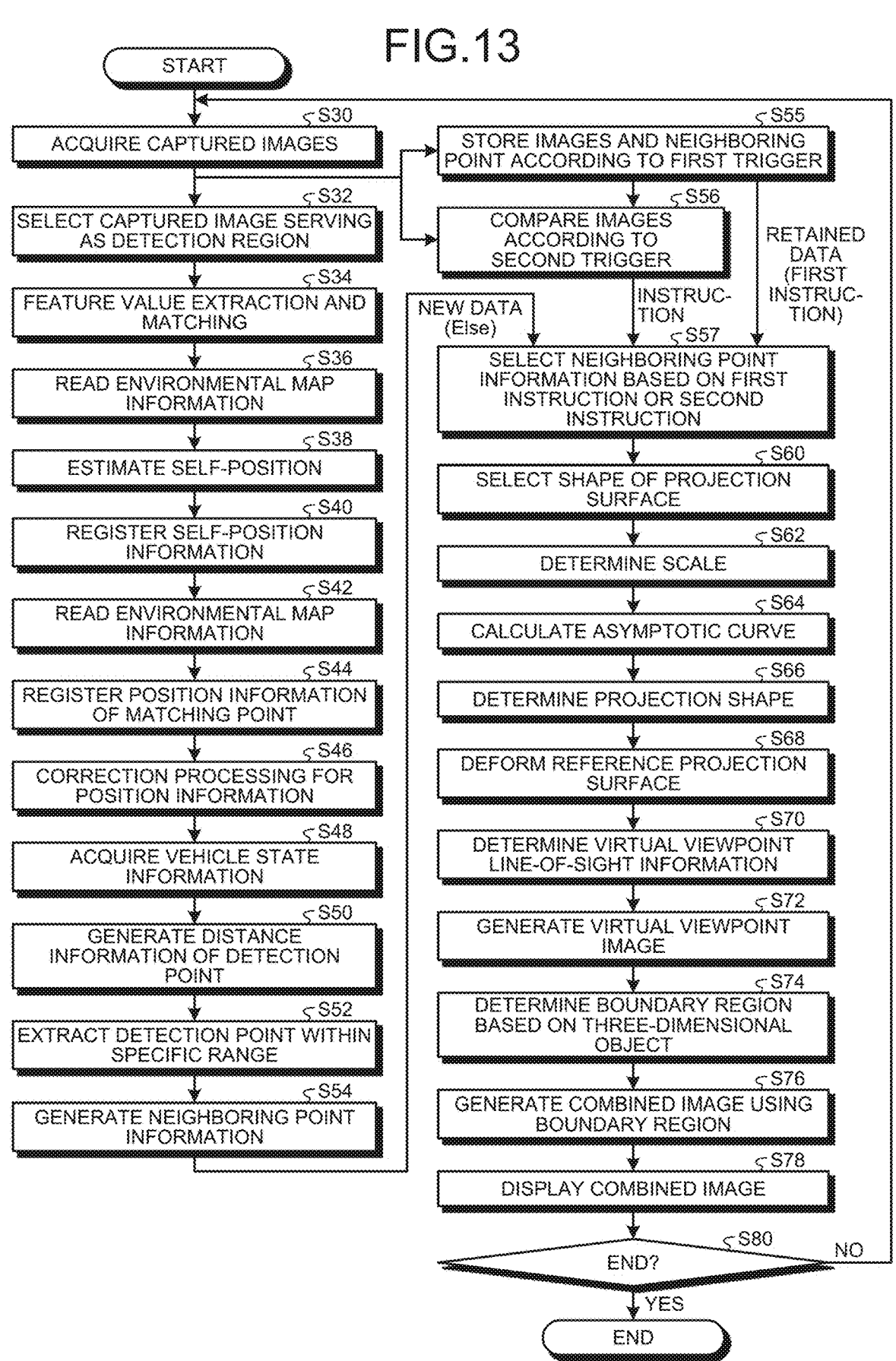
FIG. 13 is a flowchart illustrating an example of a flow of bird's-eye view image generation processing including the projection shape optimization processing according to the embodiment.

FIG. 13 is a flowchart illustrating an example of a flow of bird's-eye view image generation processing including the projection shape optimization processing according to the embodiment.

The acquisition module 20 acquires captured images for respective directions (Step S30). The selection module 21 selects a captured image serving as a detection region (Step S32).

The matching module 240 performs feature value extraction and matching processing using a plurality of captured images at different capturing timings selected in Step S32 and captured by the imaging unit 12 (Step S34). The matching module 240 registers, in the storage unit 241, information concerning corresponding points among the plurality of captured images at the different imaging timings, the information being specified by the matching processing.

The self-position estimation module 242 reads matching points and environmental map information 241A (surrounding position information and self-position information) from the storage unit 241 (Step S36). The self-position estimation module 242 estimates a relative self-position with respect to the captured image with projective conversion or the like using a plurality of matching points acquired from the matching module 240 (Step S38) and registers the calculated self-position information in the environmental map information 241A (Step S40).

The three-dimensional restoration module 243 reads the environmental map information 241A (the surrounding position information and the self-position information) (Step S42). The three-dimensional restoration module 243 performs perspective projection conversion processing using a movement amount (a translation amount and a rotation amount) of the self-position estimated by the self-position estimation module 242, determines a three-dimensional coordinate (a relative coordinate with respect to the self-position) of the matching point, and registers the three-dimensional coordinate in the environmental map information 241A as surrounding position information (Step S44).

The correction module 244 reads the environmental map information 241A (the surrounding position information and the self-position information). The correction module 244 corrects, for points matched a plurality of times among a plurality of frames, the surrounding position information and the self-position information registered in the environmental map information 241A (Step S46) using, for example, the least squares method such that the sum of the differences of distances in the three-dimensional space is minimized between a three-dimensional coordinate calculated in the past and a three-dimensional coordinate calculated anew and updates the environmental map information 241A.

The distance conversion module 27 acquires vehicle state information including speed data (own vehicle speed) of the moving body 2 included in the CAN data received from the ECU 3 of the moving body 2 (Step S48). The distance conversion module 27 converts a coordinate distance between point groups included in the environmental map information 241A into, for example, an absolute distance in meter unit using the speed data of the moving body 2. The distance conversion module 27 offsets the origin of the environmental map information to the self-position S of the moving body 2 and generates detection point distance information indicating the distance from the moving body 2 to each of the plurality of detection points P (Step S50). The distance conversion module 27 outputs the detection point distance information to the extraction module 305 and the virtual viewpoint line-of-sight determination module 34.

The extraction module 305 extracts the detection point P present within a specific range among the detection point distance information (Step S52).

The nearest neighbor specifying module 307 divides the periphery of the self-position S of the moving body 2 for each specific range, specifies the detection point P closest to the moving body 2 or a plurality of detection points P in order of closeness to the moving body 2 for each range, and extracts the distance to the nearest object (Step S54). The nearest neighbor specifying module 307 outputs a measurement distance d of the detection point P specified for each range (the measurement distance between the moving body 2 and the nearest object) to the information retaining module 308 as the neighboring point information.

The image comparison module 22 stores, according to the first trigger, the captured images in the front, left, right, and rear directions of the moving body 2 and the neighboring point information of the output of the nearest neighbor specifying module 307 (Step S55).

The image comparison module 22 calculates, according to the second trigger, similarity degrees between the captured images associated with the second trigger and the captured images accumulated and associated with the first trigger in the front, left, right, and rear directions (Step S56).

When determining that the similarity degree exceeds the predetermined threshold, the image comparison module 22 outputs, to the information retaining module 308, a first instruction for causing the information retaining module 308 to output the accumulated neighboring point information. On the other hand, when determining that the similarity degree is equal to or smaller than the predetermined threshold, the image comparison module 22 outputs, to the information retaining module 308, a second instruction for causing the information retaining module 308 to discard the accumulated neighboring point information and output the neighboring point information generated in Step S54.

The information retaining module 308 selects neighboring point information based on the first instruction or the second instruction received from the image comparison module 22 (Step S57). The information retaining module 308 outputs the neighboring point information to the reference projection surface shape selection module 309, the scale determination module 311, the asymptotic curve calculation module 313, and the boundary region determination module 317.

The reference projection surface shape selection module 309 selects a shape of the reference projection surface 40 based on the neighboring point information input from the information retaining module 308 (Step S60) and outputs selected shape information of the reference projection surface 40 to the shape determination module 315.

The scale determination module 311 determines a scale of the reference projection surface 40 having the shape selected by the reference projection surface shape selection module 309 (Step S62) and outputs scale information of the determined scale to the shape determination module 315.

The asymptotic curve calculation module 313 calculates an asymptotic curve based on the neighboring point information input from the information retaining module 308 (Step S64) and outputs the asymptotic curve to the shape determination module 315 and the virtual viewpoint line-of-sight determination module 34 as asymptotic curve information.

The shape determination module 315 determines, based on the scale information and the asymptotic curve information, a projection shape indicating how to deform the shape of the reference projection surface (Step S66). The shape determination module 315 outputs projection shape information of the determined projection shape 41 to the deformation module 32.

The deformation module 32 deforms the shape of the reference projection surface based on the projected shape information (Step S68). The deformation module 32 outputs the deformed projection surface information to the projection conversion module 36.

The virtual viewpoint line-of-sight determination module 34 determines virtual viewpoint line-of-sight information based on the self-position and the asymptotic curve information (Step S70). The virtual viewpoint line-of-sight determination module 34 outputs the virtual viewpoint line-of-sight information indicating the virtual viewpoint O and the line-of-sight direction L to the projection conversion module 36.

The projection conversion module 36 generates a projection image obtained by projecting a captured image acquired from the imaging unit 12 on the deformed projection surface based on the deformed projection surface information and the virtual viewpoint line-of-sight information. The projection conversion module 36 deforms (generates) the generated projection image into a virtual viewpoint image (Step S72) and outputs the virtual viewpoint image to the image combining module 38.

The boundary region determination module 317 determines a boundary region based on the distance to the nearest object specified for each range. That is, the boundary region determination module 317 determines a boundary region serving as a superimposition region of spatially adjacent peripheral images based on the position of the object closest to the moving body 2 (Step S74). The boundary region determination module 317 outputs the determined boundary region to the image combining module 38.

The image combining module 38 combines the virtual viewpoint images spatially adjacent to each other using the boundary region to generate a combined image (Step S76). Note that, in the boundary region, the virtual viewpoint images spatially adjacent to each other are blended at a predetermined ratio.

The display unit 16 displays the combined image serving as a bird's-eye view image (Step S78).

The information processing device 10 determines whether to end the information processing (Step S80). For example, the information processing device 10 discriminates whether a signal indicating parking completion of the moving body 2 has been received from the ECU 3 to perform the determination in Step S80. For example, the information processing device 10 may discriminate whether an instruction to end the information processing has been received by an operation instruction or the like by the user to perform the determination in Step S80.

When a negative determination is made in Step S80 (Step S80: No), the processing in Step S30 to Step S80 is repeatedly executed. On the other hand, when an affirmative determination is made in Step S80 (Step S80: Yes), the bird's-eye view image generation processing including the projection shape optimization processing according to the embodiment is ended.

Note that, when the processing returns from Step S80 to Step S30 after the correction processing in Step S46 is executed, the subsequent correction processing in Step S46 may be sometimes omitted. When the processing returns from Step S80 to Step S30 without executing the correction processing in Step S46, the subsequent correction processing in Step S46 may be sometimes executed.

The information processing device 10 according to the embodiment explained above includes the determination module 30, the deformation module 32, and the information retaining module 308 included in the determination module 30. The determination module 30 determines projection shape information concerning deformation of a projection surface on which a peripheral image of the moving body 2 is projected. The deformation module 32 deforms the projection surface based on the projected shape information. The information retaining module 308 accumulates neighboring point information serving as the second information in the past used for the projection shape information and outputs the accumulated neighboring point information in the past to the reference projection surface shape selection module 309, the scale determination module 311, the asymptotic curve calculation module 313, and the boundary region determination module 317 included in the determination module 30 at the operation start time of the moving body 2.

Therefore, the information processing device 10 can appropriately deform the projection surface shape by using the accumulated neighboring point information in the past (for example, the neighboring point information corresponding to the operation end time of the immediately preceding moving body) even at the operation start time of the moving body 2 for which the neighboring point information by the VSLAM processing has not been sufficiently obtained.

The information processing device 10 according to the embodiment includes the image comparison module 22 serving as a determining unit. The image comparison module 22 calculates a similarity degree between the first image associated with the operation end time of the moving body 2 and the second image associated with the operation start time of the moving body 2 among the plurality of peripheral images. When the similarity degree exceeds the threshold, the image comparison module 22 outputs, to the information retaining module 308, the first instruction to cause the information retaining module 308 to output the accumulated neighboring point information in the past to the determination module 30. When the similarity degree is equal to or smaller than the threshold, the image comparison module 22 outputs, to the information retaining module 308, the second instruction for discarding the accumulated neighboring point information in the past. The information retaining module 308 outputs the accumulated neighboring point information in the past to the determination module 30 in response to the first instruction and discards the accumulated neighboring point information in the past in response to the second instruction.

Therefore, the information processing device 10 can appropriately determine, according to a change in a peripheral situation from the operation end time of the moving body 2 to the operation start time of the moving body 2, whether to use the accumulated neighboring point information in the past for the deformation of the projection surface shape. As a result, at the operation start time of the moving body 2, it is possible to provide a more natural bird's-eye view image compared with the related art to the user.

Modification 1

In the embodiment explained above, the similarity degree is calculated using the captured images acquired in the front, left, right, and rear directions of the moving body 2 and the projection surface shape optimization processing is executed for each direction. In contrast, the similarity degree can also be calculated using a captured image acquired for at least one direction around the moving body 2 and the projection surface shape optimization processing can be executed for each at least one direction. In this case, the image comparison module 22 calculates a similarity degree for at least one direction among a plurality of directions around the moving body and outputs the first instruction or the second instruction for the at least one direction based on the calculated similarity degree.

Modification 2

In the embodiment explained above, when the first instruction is received, the projection surface shape can be deformed stepwise. In this case, the determination module 30 determines, using the accumulated neighboring point information in the past and the neighboring point information generated anew, projection shape information for changing the projection surface shape stepwise. The deformation module 32 deforms the projection surface stepwise using projection shape information for changing the projection surface shape stepwise. With such a configuration, the projection surface can be more naturally sequentially deformed.

Modification 3

In the embodiment explained above, it is also possible to execute processing for acquiring useful surrounding position information as early as possible at a new operation start time of the moving body 2.

For example, the moving body 2 is slightly moved at low speed around a stop position of the moving body 2 to acquire a plurality of images at different positions. In such a case, for example, the information processing device 10 further includes an information generation module that generates first control information for moving the moving body 2 and acquiring a plurality of new images obtained by imaging the periphery of the moving body 2 when the similarity degree is equal to or smaller than the threshold.

The imaging unit 12 itself may be moved by a mechanism provided in the imaging unit 12 to acquire a plurality of images at different positions. In such a case, for example, the information processing device 10 further includes an information generation module that generates second control information for moving a position of an imaging unit that images the periphery of the moving body and acquiring a plurality of new images obtained by imaging the periphery of the moving body when the similarity degree is equal to or smaller than a threshold.

Modification 4

In the embodiment explained above, all driving modes of the automatic parking mode, the semi-automatic parking mode, the manual driving mode can be used as driver assistance.

Although the embodiments and the modifications are explained above, the image processing device, the image processing method, and the computer program product disclosed in the present application are not limited to the embodiments and the like explained above per se. The constituent elements can be modified and embodied in implementation stages and the like without departing from the gist of the embodiments. In addition, various inventions can be formed by appropriate combinations of a plurality of constituent elements disclosed in the embodiments and the modifications explained above. For example, several constituent elements may be deleted from all the constituent elements explained in the embodiments.

Note that the information processing device 10 in the embodiments and the modifications explained above can be applied to various apparatuses. For example, the information processing device 10 in the embodiments and the modifications can be applied to a monitoring camera system that processes a video obtained from a monitoring camera, an in-vehicle system that processes an image of a peripheral environment outside a vehicle, or the like.

According to one aspect of an image processing device disclosed in the present application, it is possible to provide a bird's-eye view image more natural compared with the related art when the projection surface of the bird's-eye view image is sequentially deformed according to the three-dimensional object around the moving body.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing device comprising:
a first determination module configured to determine first information concerning deformation of a projection surface on which a peripheral image of a moving body is projected; and
a deformation module configured to deform the projection surface based on the first information, wherein
the first determination module includes an information retaining module configured to accumulate second information in past used for determining the first information, and is configured to determine the first information based on the second information in the past at an operation start time of the moving body, the information retaining module is configured to accumulate the second information corresponding to an operation end time of the moving body as the second information in the past,
the image processing device further comprises a second determination module configured to output a first instruction to the first determination module when determining that a first image associated with the operation end time of the moving body and a second image associated with the operation start time of the moving body are similar among a plurality of the peripheral images, and
the first determination module is configured to determine the first information based on the second information in the past accumulated in the information retaining module in response to the first instruction.

2. The image processing device according to claim 1, wherein the second determination module is configured to output the first instruction when determining that the first image and the second image are similar for at least one of a plurality of directions around the moving body.

3. The image processing device according to claim 1, wherein
the first determination module is configured to determine, after operation start of the moving body, by using the second information in the past and the second information generated anew, the first information that changes stepwise, and
the deformation module is configured to deform the projection surface stepwise by using the first information that changes stepwise.

4. The image processing device according to claim 1, further comprising an information generation module configured to generate, when the second determination module is configured to determine that the first image and the second image are not similar, first control information for moving the moving body to acquire a plurality of new images obtained by imaging a periphery of the moving body.

5. The image processing device according to claim 1, further comprising an information generation module configured to generate, when the second determination module is configured to determine that the first image and the second image are not similar, second control information for moving a position of an imaging unit, which images a periphery of the moving body, to acquire a plurality of new images obtained by imaging the periphery of the moving body.

6. An image processing method executed by a computer, the method comprising:
determining first information concerning deformation of a projection surface on which a peripheral image of a moving body is projected; and
deforming the projection surface based on the first information, wherein
the determining includes accumulating second information in past used for determining the first information, and determining the first information based on the second information in the past at an operation start time of the moving body,
the second information in the past corresponds to an operation end time of the moving body,
the image processing method further comprises outputting a first instruction when determining that a first image associated with the operation end time of the moving body and a second image associated with the operation start time of the moving body are similar among a plurality of the peripheral images, and the determining of the first information is executed based on the second information in the past accumulated in response to the first instruction.

7. A non-transitory computer readable medium having instructions thereon, the instructions, when executed by a computer, causing the computer to perform operations comprising:

determining first information concerning deformation of a projection surface on which a peripheral image of a moving body is projected; and deforming the projection surface based on the first information, wherein the determining includes accumulating second information in past used for determining the first information, and determining the first information based on the second information in the past at an operation start time of the moving body, the second information in the past corresponds to an operation end time of the moving body, the operations further comprise outputting a first instruction when determining that a first image associated with the operation end time of the moving body and a second image associated with the operation start time of the moving body are similar among a plurality of the peripheral images, and the determining of the first information is executed based on the second information in the past accumulated in response to the first instruction.

* * * * *